July 23, 1929.  H. VISSERING  1,721,891
LUBRICATOR
Filed July 14, 1924   2 Sheets-Sheet 1
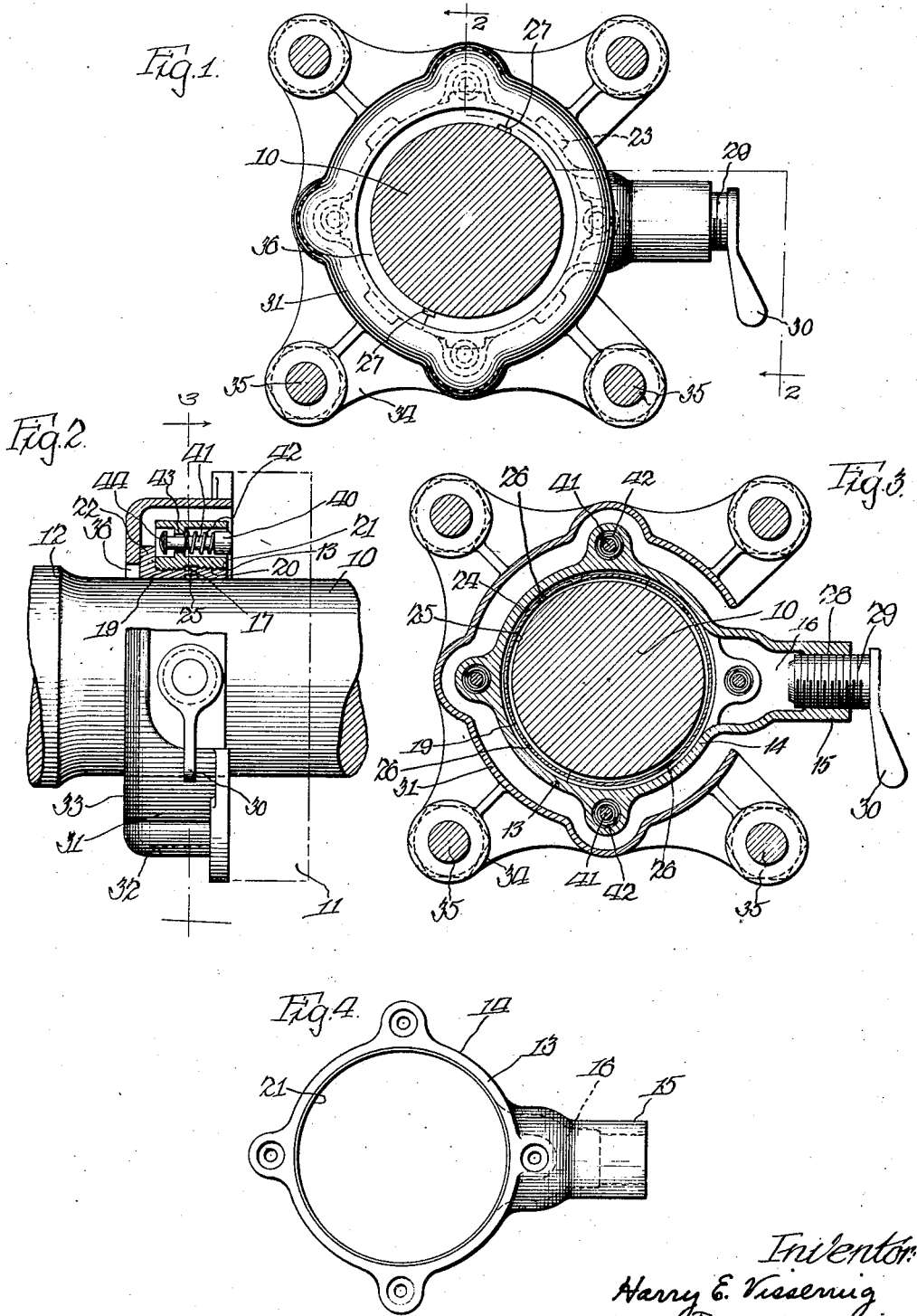
Inventor:
Harry E. Vissering
By Fred Gerlach
his Atty.

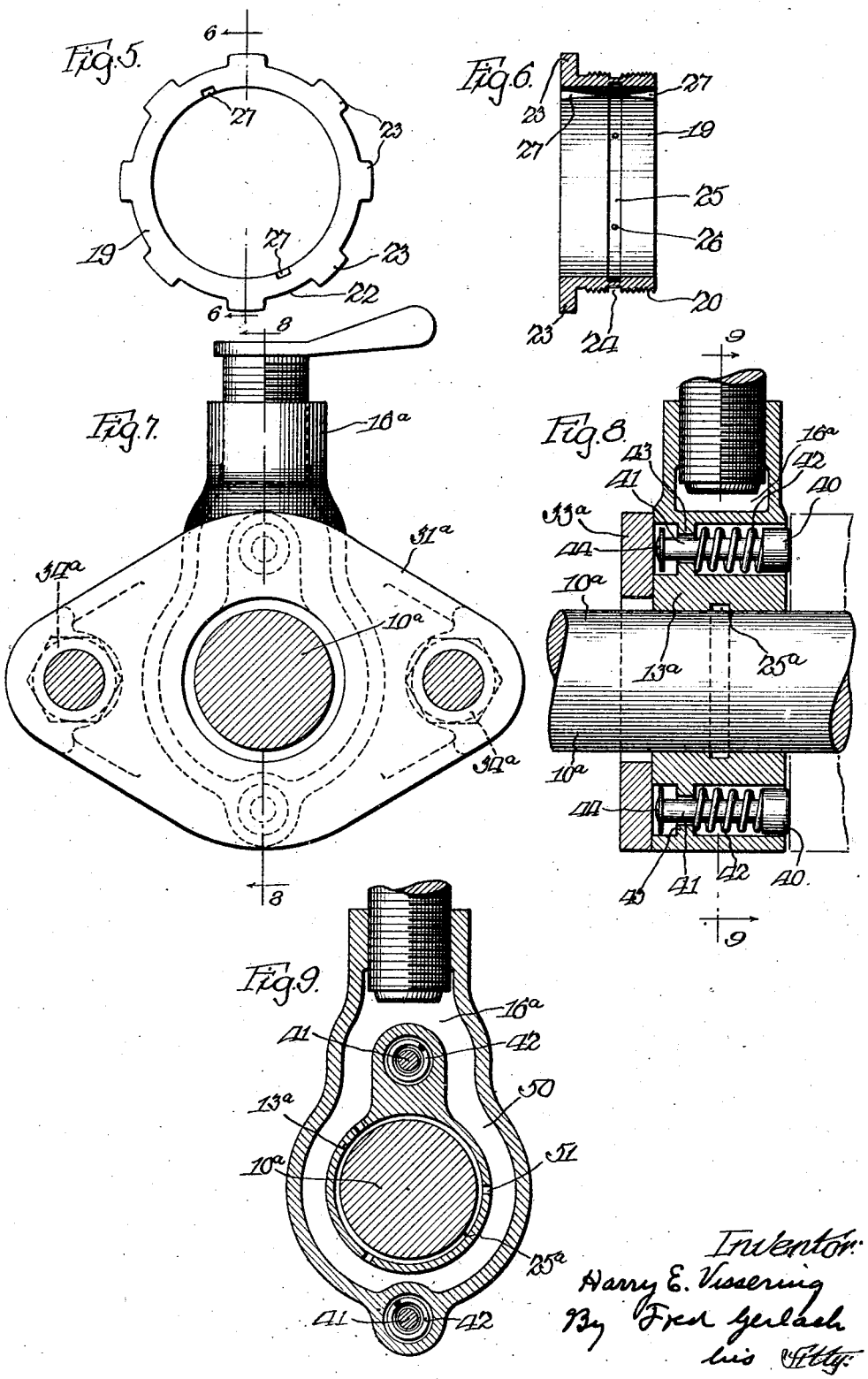

Patented July 23, 1929.

1,721,891

UNITED STATES PATENT OFFICE.

HARRY VISSERING, OF KENILWORTH, ILLINOIS, ASSIGNOR TO HARRY VISSERING AND COMPANY, OF CHICAGO, ILLINOIS, A CORPORATION OF ILLINOIS.

LUBRICATOR.

Application filed July 14, 1924. Serial No. 725,810.

The invention relates to lubricators for reciprocating rods, such, for example, as piston rods and valve-stems.

In practice, devices of this character are usually associated with the packing boxes in which the rods slide. These boxes are usually provided with an adjustable gland to take up wear upon the packing. One object of the invention is to provide means for preventing the lubricating device from being slammed back and forth with the rod whenever any play exists between the device and the packing gland, as the result of the adjustment of the latter or for any other reason. Another object of the invention consists in providing the lubricating device with an improved bushing which is formed of sections which can be placed around the rod while it is in operative position.

Another object of the invention is to provide an improved lubricating device which is suitably held against longitudinal movement with or by the rod but is not transversely confined, so that it will float or be movable with the rod. In practice, it sometimes occurs that the rod-guides are out of line or the rod is not truly coaxial with the cylinder, and by providing a construction in which the lubricating device is transversely movable with the rod, the undue friction and wear between the lubricating device and the rod will be overcome.

The invention consists in the several novel features hereinafter set forth and more particularly defined by the claims at the conclusion hereof.

In the drawings: Fig. 1 is a front elevation of a lubricating device embodying the invention, the piston rods and the bolts for the lubricator retainer being shown in section. Fig. 2 is a section on line 2—2 of Fig. 1. Fig. 3 is a section on line 3—3 of Fig. 2. Fig. 4 is an elevation of the lubricant container. Fig. 5 is a section of the lubricator bushing. Fig. 6 is a section on line 6—6 of Fig. 5. Fig. 7 is an elevation of a modified form of the invention, the piston rod and retaining bolts for the lubricator retainer being shown in section. Fig. 8 is a section on line 8—8 of Fig. 7. Fig. 9 is a transverse section on line 9—9 of Fig. 8.

The invention is exemplified in a lubricator which is applied to a piston rod 10 which slides through a packing box comprising an adjusting gland 11 for the packing therein, as well understood in the art. The piston is usually provided with an enlarged portion 12 for the cross-head fit, as well understood in the art.

The improved lubricating device consists of a container 13 provided with a ring-portion 14 and a grease-cup 15 integrally formed with the ring-portion and provided with a grease-retaining chamber 16 in communication with an annular groove 17 formed on the internal periphery of the ring-portion 14. A bushing 19 is provided with an external thread 20 to engage an internal thread 21 on the container ring 14. This bushing is provided at its outer end with a flange 22 and lugs 23, whereby the bushing may be conveniently rotated by means of a suitable tool. The central portion of the outer periphery of the bushing has an annular groove 24 to receive lubricant from the groove 17 in the container ring. The bushing is also provided with an internal groove 25 and small holes 26 between annular grooves 24 and 25 to deliver grease to the outer periphery of the piston-rod 10. In practice, it is advantageous, in some instances, to form the bushing of sections to permit it to be applied to the piston-rod after the latter is in connected relation with a cylinder. For this purpose, the opening in container-ring 14 is of sufficient diameter to slip endwise over the cross-head fit 12 of the rod. The bushing is originally cast in a single piece threaded to fit in said ring and bored to fit around the piston-rod and is also formed with grooves 27 at diametrically opposite points to render the ring fracturable into sections by means of a cold chisel or similar tool. These grooves will cause the bushing to be fractured at diametrically opposite points or into sections of substantially 180° each, so that the sections may be applied laterally to the piston-rod and, when fitted together, can be turned into the container ring to form a snug sliding fit between the lubricating device and the piston. The grease-cup 15 is provided with an internal screw-thread 28 for an externally threaded plug 29 which is adapted to force and feed the grease into the groove 17. A handle 30 is formed on the plug so that it can be conveniently turned.

A retainer 31 is provided to hold the lubricant container against movement with the piston-rod and comprises an annular portion 32, an integral inturned flange 33 extended to engage the outer end of the bushing 19 and lugs 34. Bolts 35 extend loosely through the holes in lugs 34 and are adapted to secure the retainer to the cylinder or other part in which the piston slides. The opening 36 in flange 33 is of sufficient diameter to provide ample clearance between the retainer and the piston-rod. In practice, the lubricating devices are usually associated with the gland 11 of the packing-box, through which the piston slides and the inner end of the retainer 31 is adapted to approximately fit against the outer face of the gland. To prevent any longitudinal play of the lubricating device, resulting from the adjustment of the gland 11 or from any other reason, the lubricant container is provided with spring devices for preventing the lubricant container from reciprocating with the piston and from being slammed back and forth between the gland and the retainer. Each of these devices comprises a plunger 40 which is slidably mounted in the container-ring, a stem 41 for the plunger, a coil-spring 42 confined between the plunger 40 and a shoulder 43, and a stop 44 on the outer end of the stem to limit the movement of the plunger in the container ring and prevent it from being disassociated therefrom when the ring is not in an operative position. Preferably, sufficient number of these spring-pressed plungers are provided to avoid any cramping pressure between the lubricator and the piston. In operation, these spring-plungers will force the lubricant container and bushing away from the gland 11 and against flange 33 of the retainer, despite variation of the distance between the gland and the retainer. A characteristic of this construction is that the lubricant container and its bushing are free to float or move transversely with the piston, because they are free to move transversely relatively to the gland 11 and retainer and to follow the piston. This is of importance when the piston-guides become out of line or the rod passes out of its true coaxial relation with the cylinder.

The invention exemplifies an improved lubricator for reciprocating rods in which provision is made for yieldingly holding the lubricant container against longitudinal movement, in which the lubricating device is mounted so it is free to float with the piston-rod and in which provision is made for a sectional bushing which has been machined while it is unitary.

In Figs. 7, 8, and 9, the invention is illustrated as applied to a valve-stem $10^a$. In this form of the invention, the lubricant container $13^a$ is fitted directly to the stem $10^a$, in lieu of being provided with a bushing. A retainer $31^a$ is secured by bolts $34^a$ to the cylinder. A pair of oppositely disposed spring-pressed plungers 40 are applied to yieldingly hold the container against the outer wall $33^a$ of the container to prevent the slamming of the container back and forth by the valve-stem. The container is provided with an annular duct 50 which receives grease from the cup $16^a$ and holes 51 which conduct the grease from said duct to an annular groove $25^a$ formed in the inner periphery of the container.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a lubricating device for a reciprocating rod, the combination of a lubricant container mounted around the rod and provided with a duct to deliver free lubricant to said rod, a retainer in which the container fits loosely, and means to resist longitudinal movement of the container in the retainer by the rod comprising plungers and springs applied to the plungers.

2. In a lubricating device for a reciprocating rod, the combination of a retainer having a wall spaced from the gland or cylinder wall in which the rod reciprocates, a lubricant container mounted between the walls and around the rod and provided with a duct to deliver free lubricant to the rod, said container being free to be guided angularly and transversely by the rod within and independently of the retainer, and spring means for confining the container against longitudinal movement between the walls.

3. In a lubricating device for a reciprocating rod, the combination of a container extending around the rod and provided with a lubricant chamber and an outlet for said chamber, the internal diameter of the container being larger than the diameter of the rod, a bushing in the container formed to fit the rod and provided with a duct in communication with said outlet and adapted to receive free lubricant therefrom for delivery to the rod, and a retainer in which the container and bushing loosely fit.

4. In a lubricating device for a reciprocating rod, the combination of a container extending around the rod and provided with a lubricant chamber and an outlet for the chamber, the internal diameter of the container being larger than the diameter of the rod, a bushing formed to fit the rod and provided with a duct in communication with said outlet and adapted to receive free lubricant therefrom for delivery to the rod, interengaging screw-threads formed on the bushing, and the container respectively, and a retainer in which the container and bushing loosely fit.

5. In a lubricating device for a reciprocating rod, the combination of a container extending around the rod and provided with a lubricant chamber and an outlet for the chamber, the internal diameter of the container being larger than the diameter of the rod, and a bushing in the container formed to fit the rod and consisting of sections fractured from an integral ring, said bushing being provided with a duct in communication with said outlet and adapted to receive free lubricant therefrom for delivery to the rod, and a retainer in which said container and bushing loosely fit.

6. In a device for lubricating a reciprocatory rod, the combination of a container for free lubricant adapted to be mounted on the rod and provided with a duct for delivering the lubricant to said rod, a retainer for the container, the latter fitting loosely in the retainer so that it may be moved angularly and transversely by the rod, and a spring applied to the container for preventing the latter from being reciprocated by the rod back and forth in the retainer.

Signed at Chicago, Illinois, this 8th day of July, 1924.

HARRY VISSERING.